(12) United States Patent
Gentric et al.

(10) Patent No.: US 11,947,553 B2
(45) Date of Patent: Apr. 2, 2024

(54) DISTRIBUTED DATA PROCESSING

(71) Applicant: Amadeus S.A.S., Biot (FR)

(72) Inventors: Philippe François Georges Gentric, La-Colle-sur-Loup (FR); Carlos Lo-Iacono Garcia, Valbonne (FR); Charles-Antoine Robelin, Antibes (FR); Matthieu Delost, Grasse (FR)

(73) Assignee: Amadeus S.A.S., Biot (FR)

( * ) Notice: Subject to any disclaimer, the term of this patent is extended or adjusted under 35 U.S.C. 154(b) by 214 days.

(21) Appl. No.: 17/430,953

(22) PCT Filed: Mar. 4, 2020

(86) PCT No.: PCT/EP2020/055676
§ 371 (c)(1),
(2) Date: Aug. 13, 2021

(87) PCT Pub. No.: WO2020/178327
PCT Pub. Date: Sep. 10, 2020

(65) Prior Publication Data
US 2022/0164348 A1 May 26, 2022

(30) Foreign Application Priority Data
Mar. 4, 2019 (FR) ..................................... 1902187

(51) Int. Cl.
*G06F 16/2458* (2019.01)
*G06F 16/23* (2019.01)
*G06F 16/27* (2019.01)

(52) U.S. Cl.
CPC ...... *G06F 16/2471* (2019.01); *G06F 16/2365* (2019.01); *G06F 16/27* (2019.01)

(58) Field of Classification Search
CPC ... G06F 16/2471; G06F 16/27; G06F 16/2365
(Continued)

(56) References Cited

U.S. PATENT DOCUMENTS 8,276,084 B2 9/2012 Castelli et al.
8,616,976 B2 12/2013 Kaarela et al.
(Continued)

FOREIGN PATENT DOCUMENTS

EP 2885725 B1 6/2015

OTHER PUBLICATIONS

Deshpande, Amol et al. "Cache-and-Query for Wide Area Sensor Databases". SIGMOD '03: Proceedings of the 2003 ACM SIGMOD international conference on Management of data. Jun. 2003. Accessed Sep. 12, 2023 from <https://doi.org/10.1145/872757.872818> (Year: 2003).*

(Continued)

*Primary Examiner* — Robert W Beausoliel, Jr.
*Assistant Examiner* — Lauren Zannah Ganger
(74) *Attorney, Agent, or Firm* — Thompson Hine LLP (57) ABSTRACT

Data is processed in a distributed computing environment with at least one server and a plurality of clients comprising at least a first client and a second client. The first client sends a first request to the server to obtain result data, receives raw data from the server as a response to the first request, processes the raw data to obtain the result data and stores the result data, and sends the result data to the second client in response to receiving a third request to obtain the result data from the second client.

20 Claims, 7 Drawing Sheets

(58) Field of Classification Search
USPC .......................................................... 707/770
See application file for complete search history.

(56) References Cited

U.S. PATENT DOCUMENTS

| | | | |
|---|---|---|---|
| 9,292,620 B1* | 3/2016 | Hoover | ............... G06F 16/2471 |
| 9,747,340 B2* | 8/2017 | Rao | ....................... G06F 16/172 |
| 2007/0005679 A1 | 1/2007 | Bui et al. | |

OTHER PUBLICATIONS

Donald Kossmann. 2000. The state of the art in distributed query processing. ACM Comput. Surv. 32, 4 (Dec. 2000), 422-469.

X. Shen and Z. Li, "Implementing Database Management System in P2P Networks," 2008 International Seminar on Future Information Technology and Management Engineering, 2008, pp. 528-532.

Vancea A., Stiller B. (2009) Answering Queries Using Cooperative Semantic Caching. In: Sadre R., Pras A. (eds) Scalability of Networks and Services. AIMS 2009. Lecture Notes in Computer Science, vol. 5637. Springer, Berlin, Heidelberg.

Alexandros Labrinidis et al., "Caching and Materialization for Web Databases", Foundations and Trends in Databases, vol. 2, No. 3, Jan. 1, 2010, pp. 169-266.

European Patent Office, International Search Report and Written Opinion issued May 8, 2020 in International Application No. PCT/EP2020/055676.

W. S. Ng, B. C. Ooi, K. .-L. Tan and Aoying Zhou, "PeerDB: a P2P-based system for distributed data sharing," Proceedings 19th International Conference on Data Engineering (Cat. No. 03CH37405), Bangalore, India, 2003, pp. 633-644, doi: 10.1109/ICDE.2003. 1260827.

Li, Xiuqi & Wu, Jie. (2005). "Searching Techniques in Peer-to-Peer Networks." Handbook on Theoretical and Algorithmic Aspects of Sensor, Ad Hoc Wireless, and Peer-to-Peer Networks. 10.1201/ 9780203323687.ch37.

European Patent Office, First Office Action issued in European Patent Application No. 20707446.9 on Jun. 16, 2023, 8 pages.

* cited by examiner

DISTRIBUTED DATA PROCESSING

The present invention relates to database technology and data handling in a distribut-ed computer environment comprising at least one server and a plurality of clients comprising at least a first client and a second client. More specifically, it relates to data processing and mak-ing available data to clients.

The evolution of web technologies and distributed computing systems over the last decades has led to a significant increase of web traffic load and server workload. Therefore, a further increase in web traffic load and server workload is to be expected, resulting in an increase of hardware and software requirements for such distributed computing systems. Over the last years, some approaches have been undertaken to address increasing web traffic workload and server workload.

US 2007/0005679 A1 presents a method for performing a search in a client-server system. A client subsystem receives a set of initial search results from a server subsystem, a rule engine initiates a scan of the client subsystem to collect technical information associated with the client subsystem, and the rules engine filters the set of initial search results at the client subsystem. The filtering step is based on the collected technical information.

U.S. Pat. No. 8,276,084 B2 presents performance adjustment in a virtual universe. In a mixed server-based/peer-to-peer approach, transmission responsibilities are shifted towards peer-to-peer computing as the number of avatars within a region increases. The server can "offload" further processing of data to the clients for enhancing server performance. For example, a user moving in the virtual universe may receive high-resolution information on the landscape from other users that are already in the area and that have previously obtained the high-resolution data such as textures, geometries, etc. from the virtual universe server.

U.S. Pat. No. 8,616,976 B2 describes the provision of gaming services via ad hoc peer-to-peer networks. Peer devices acting as clients download games data from a database which functions as a server. The peer devices can send the downloaded data and generated data to other peer devices.

According to a first aspect, a method for handling data in a distributed computing environment is provided. The computing environment comprises at least one server and a plurality of clients comprising at least a first client and a second client. The first client sends a first request to the server to obtain result data. The first client then receives raw data from the server as a response to the first request. Next, the first client processes the raw data to obtain the result data and stores the result data. In response to receiving a third request to obtain the result data from the second client, the first client sends the result data to the second client.

According to a further aspect, the server stores the first request received from the first client as an indication that the result data is available at the first client.

According to a still further aspect, the second client sends a second request to the server for obtaining the result data and, in response, receives an indication from the server indicating that the result data is available at the first client. The second client then stores the indication returned by the server that the result data is available at the first client and sends the third request to the first client to obtain the result data.

In accordance with a still further aspect, the second client receives a fourth request from a third client to obtain the result data and, in response, sends the indication returned by the server that the result data is available at the first client to the third client. The third client is then able to retrieve the result data from the first client.

In accordance with a still further aspect, the first client receives an indication from the server indicating a validity duration of the raw data. The first client deletes the result data at a given time corresponding to the validity duration indicated by the server.

According to a still further aspect, the stored first request stored at the server as the indication that the result data is available at the first client includes the indication indicating the validity duration of the raw data. The server deletes the stored first request at a given time corresponding to the validity duration.

According to another aspect, a client device for handling data in a distributed computing environment is provided. The client device is arranged to send a first request to a server to obtain result data, to receive raw data from the server as a response to the first request, to process the raw data to obtain result data and store the result data, and to send the result data to another client device in response to receiving a third request to obtain the result data from the other client.

According to further aspects, the client device is further arranged to perform the method steps at the first client, second client and/or third client as set forth above.

According to still another aspect, a server for handling data in a distributed computing environment is provided. The server is arranged to receive a first request from a first client to obtain result data; return raw data to the first client as a response to the first request; store the first request received from the first client as an indication that the result data is available at the first client; receive a second request from a second client to obtain the result data; and to return the indication to the second client indicating that the result data is available at the first client.

According to further aspects, the server is further arranged to perform the method steps at the server as set forth above.

In accordance with still another aspect, a computer program product is provided. The computer program product comprises program code instructions stored on a computer readable medium to execute the method steps and/or functions of the first client, second client and/or third client and/or the server set forth above when said program is executed on a computer.

The present mechanisms will be described with reference to accompanying figures. Similar reference numbers generally indicate identical or functionally similar elements.

The increase of server workload in distributed computing environments and content distribution networks due to the increase in the number of requests for data sent by clients and the subsequent searching, receiving and processing of the data leads to increasing costs for operating the servers, such as CPU costs and storage costs. In addition, clients have to wait longer times until their requests are processed and the requested data is returned. This can lead to user devices and interfaces being less responsive and further unnecessary follow-on requests from the user devices and users assuming that the current request is not processed correctly.

Furthermore, the increase in the number of requests for data sent by clients and the subsequent searching, receiving and processing of the data leads to increasing web traffic load in a distributed computing environment, thereby lowering transfer speed and increasing bandwidth utilization. Clients have to wait longer for the delivery of the requested data and the network loads increase.

To cite an example, the hit rate of a frequented Internet-accessible content database may exceed more than 1 billion transactions per day, with an expected exponential increase. Database hosts respond to these developments by leveraging caches and installing real-time content delivery/distribution networks, thereby optimizing performance and reducing costs. These approaches, however, do not use the increasingly available computing power on the client side so far.

Computing power and data storage capacities of client devices such as mobile phones and laptops have increased during the last decades due to more powerful hardware such as smartphone processing units and graphic cards. The computing power of client devices has also increased due to developments on the software side, as operating systems like iOS® and Android®, JavaScript® in browsers and applications for mobile devices, commonly known as "apps", have entered the market. Therefore, current client systems possess a significant autonomy with regard to the capabilities to operate software tools and platforms as well as data storage capacities which enable clients to take over enhanced computing and server functionalities.

According to the present embodiments, in order to handle the increase of server workload in a distributed computing environment when the number of requests from clients and the magnitude of requested data is increasing, the processing of requested data is shifted at least to some extent from the requested server towards the requesting clients.

Figure 1:
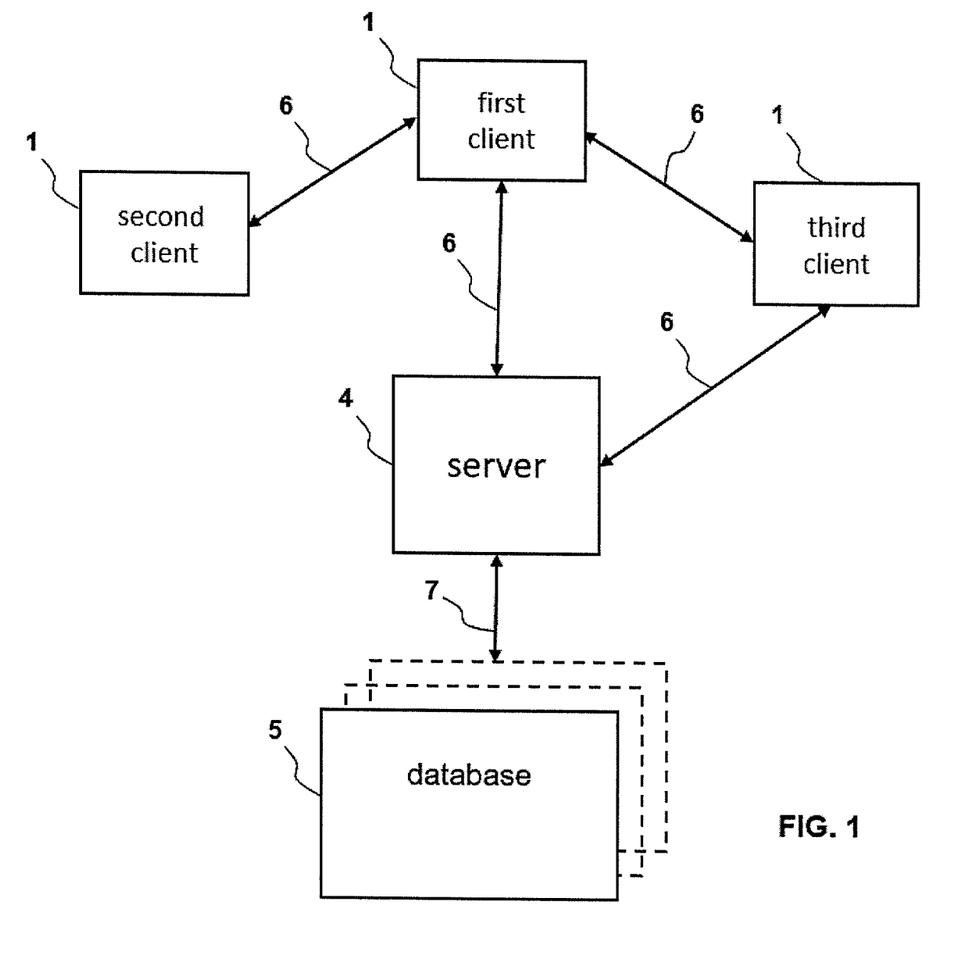
FIG. 1 is schematic depiction of a distributed computer environment according as described herein.

FIG. 1 illustrates a distributed computing system as utilized herein in a schematic manner comprising of a server 4, a number of clients 1, a number of databases 5 and a number of communication interfaces 6.

Figure 7:
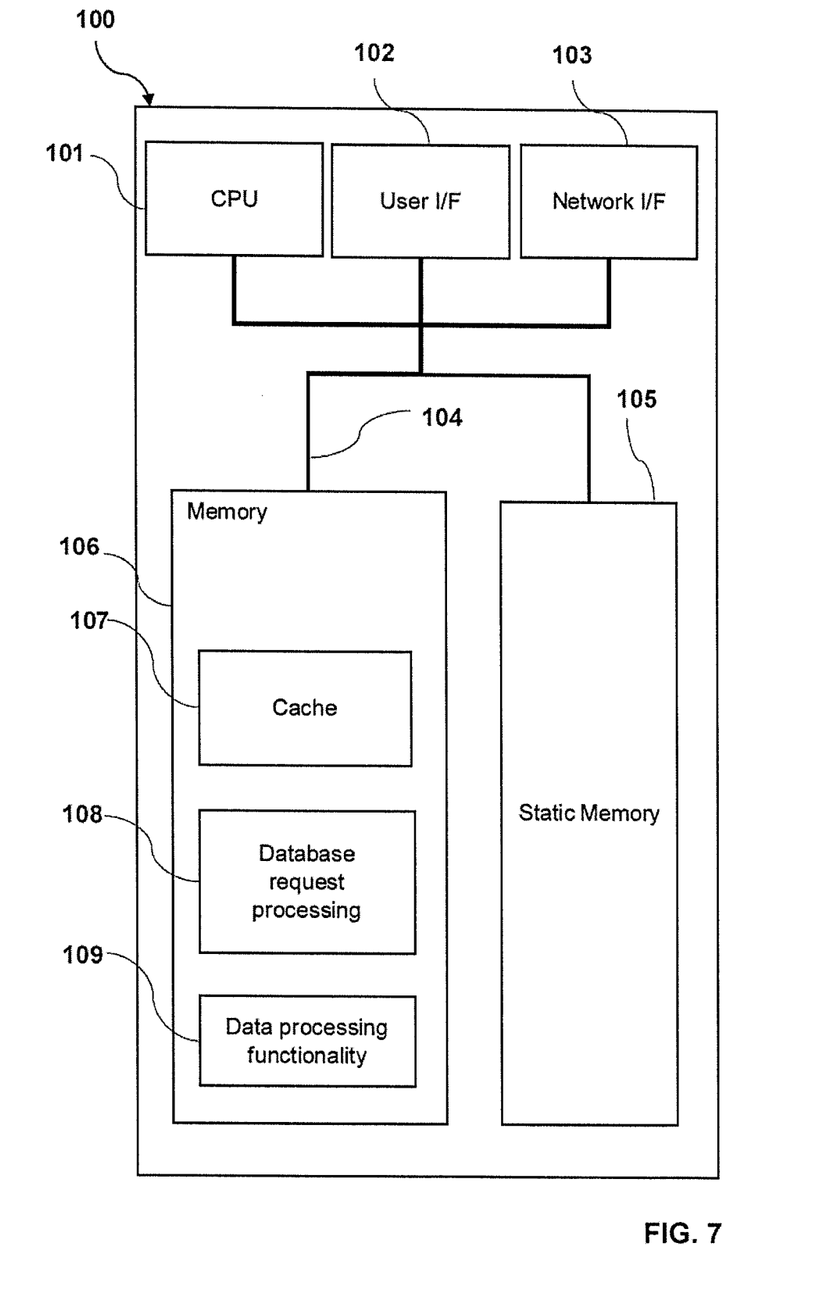
FIG. 7 is a diagrammatic representation of the internal components of a computing machine according to some embodiments.

The server 4, the clients 1 and the databases 5 may be constituted of several hardware machines depending on performance requirements. Both, server 4 and clients 1, are embodied e.g. as stationary or mobile hardware machines comprising computing machines 100 as illustrated in FIG. 7, and/or as specialized systems such as embedded systems arranged for a particular technical purpose, and/or as software components running on a general or specialized computing hardware machine (such as a web server and web clients).

The server 4 and the clients 1 are interconnected by the communication interfaces 6. Each of the interfaces 6 utilizes a wireline or wireless Local Area Network (LAN) or a wireline or wireless Metropolitan Area Network (MAN) or a wireline or wireless Wide Area Network (WAN) such as the Internet or a combination of the aforementioned network technologies and are implemented by any suitable communication and network protocol(s).

In current prior art solutions, a client 1 sends a request for data to the server 4. The server 4 subsequently identifies and receives data corresponding to the request from one or more databases 5. The one or more databases 5 may be hosted at the server 4 itself or may be located remotely from the server 4. In both cases, the databases 5 are accessible via a communication interface 7 by the server. The data held at the databases 5 are generally still yet not completely processed in accordance with the request from the client 1, i.e. the data available to the server is usually not yet present in a form to be directly be returned to the client 1 in response to receiving the request. Rather, the server 4 processes the data available in the databases 5 in order to extract, re-format, sort, manipulate etc. the data in order to obtain a representation of the data that corresponds to requirements set forth in the request by the client. Only the processed data is then returned to the client 1, i.e. the complete processing of the data held at the databases 5 is performed at the server side.

Figure 2:
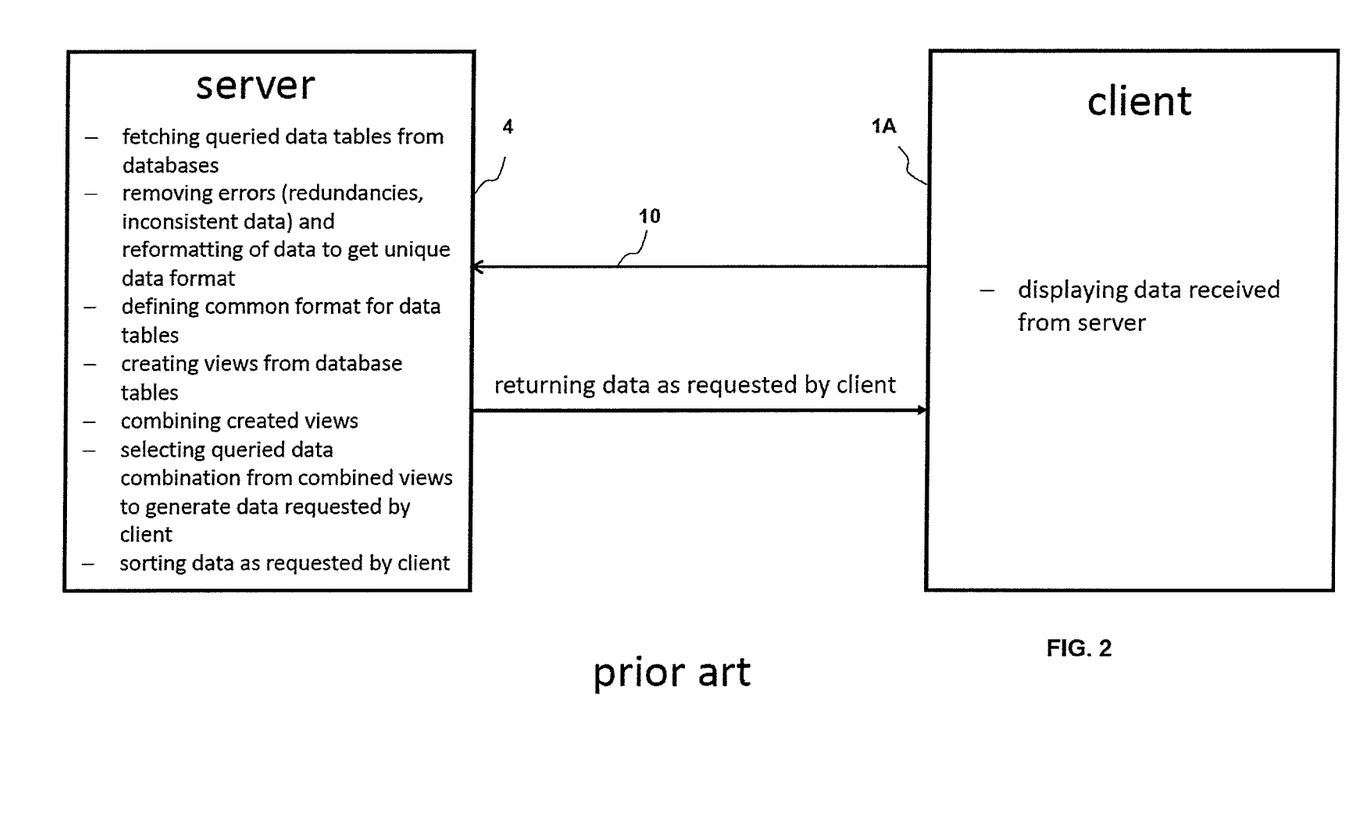
FIG. 2 is a schematic representation of a process of a server-based data processing according to the present prior art.

Exemplarily, a process of server-based data processing as performed according to the prior art is described and visualized in FIG. 2. The server 4 holds a relational SQL database (one of the databases 5 in FIG. 1) and receives an SQL query (request 10) from a client to retrieve some data from the SQL database, such as a view "tableAB" based on two database tables, "tableA" and "tableB". After receiving the request 15 from the client 1A, the server 4 identifies the relevant database tables of the SQL database. Subsequently, the server 4 receives the identified database tables and stores the database tables e.g. in the main storage system of the server 4.

Still referring to the example of FIG. 2, the server 4 continues with the processing of the retrieved database tables and creates subsets of database tables from the database tables using the SQL command CREATE VIEW. The subsets of database tables form again database tables and are commonly known as views and serve as a basis for the creation of new database tables using SQL-statements such as JOIN, LEFT OUTER JOIN, RIGHT OUTER JOIN etc. Subsequently, using a SQL-statement such as SELECT, the server 4 creates the data requested by one of the clients 1A. In addition, the data is sorted according to criteria as identified in the request 10 from the client 1A.

To further specify the example, database table "tableA" may reside on a first database 5 and database table "tableB" may reside on a second database 5. Server 4 receives "tableA" and "tableB" and stores them in the main storage system or the cache of server 4. After uncoding, elimination of errors and the definition of a common format as described in the aforementioned examples, the server 4 continues with the processing using the following SQL-statements:
CREATE VIEW viewA (data1A, data2A) AS
SELECT data1A, data2A FROM tableA;
CREATE VIEW viewB (data1B, data2B) AS
SELECT data1B, data2B FROM tableB;
CREATE VIEW tableAB AS
SELECT data1C, data2C, data2A, data3C, data2B
from tableC, viewA, viewB
where tableC.data1C=viewA.data1A
and tableC.data2C=viewB.data1B Finally, the data stored in view "tableAB" is further processed by the server 4 such as data compression before sent to the client 1A which has requested the data (view "tableAB").

Hence, as illustrated by the example of FIG. 2, the server 4 employs significant computing resources and computing time to process the data stored in the SQL database 5 before the processed data is returned to the client 1A which constitutes a significant load on the server 4, in particular in times of a high number of client requests per time to be answered.

To address this situation, according to the present embodiments, the server 4 does not anymore perform the complete processing of the data received from one or more of the databases 5 to produce the data requested by the client 1. Rather, at least a part of the data processing is relocated to the requesting client 1. To this end, a particular client 1, referred to as first client 1A, is considered in the following. The first client 1A sends a data request 10, also referred to as first request, to the server 4 to obtain result data. The term "result data" herein generally denotes the data in the representation as requested by a client 1, i.e. as traditionally processed at the server side as described above with reference to FIG. 2.

According to the present embodiments, the server 4 does, however, not return the result data as requested by the client 1A, but only raw data. The term "raw data" generally refers herein to data held at the databases 5 and retrieved from the server 4, being in a state that is not yet completely processed by the server 4 in order to meet requirements of the request 10 from the client 1. The raw data is e.g. organized in database tables. In some embodiments, the databases 5 are relational databases which are queried using SQL statements. The raw data does not yet constitute the data in terms of content, format, order etc. which was requested by the client. Rather, the raw data might be in different formats correlating with different databases and might be uncoded or unformatted. In addition, the raw data may contain redundancies or overhead, or might still be unfiltered and thus contain more content than actually requested by the client 1. For example, the raw data is a superset of the result data requested by the client 1, i.e. in other words, the requested result data is a subset of the raw data returned by the server 4 in response to the first request (the subset may be subject to further processing such as aggregations, decoding, formatting, ordering, etc., as explained). The raw data are still not processed in that way to get those types of result data the client actually requested. Correspondingly, result data is the result of processing the raw data in accordance with client request requirements.

According to the present embodiments, at least a part of the processing to transform raw data into result data is performed by the requesting client 1A on the raw data received from the server 4 in response to the client's request 10. More specifically, in some embodiments, a part of the processing is still done by the server 4, while the remaining part of the processing (hitherto also performed by the server 4) is relocated to the client side. For example, the server 4 may still remove redundant data sets and select those data from the database tables which are actually needed, while other tasks such as formatting and sorting the data are only done by the client. This relieves the server 4 from at least a part of data processing tasks to respond to data requests and instead makes use of the distributed computation resources of client devices.

Figure 3:
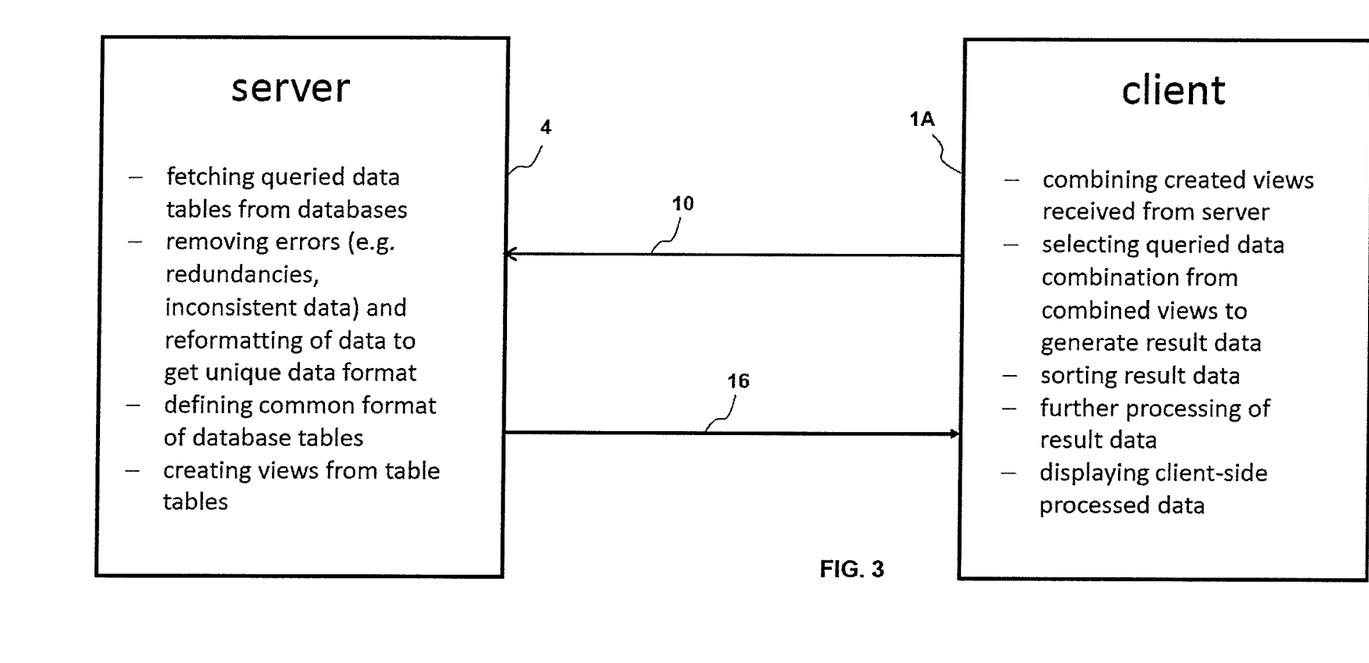
FIG. 3 is a schematic representation of a process of a client-shifted data processing according to some embodiments.

In some embodiments and exemplarily shown in FIG. 3, the tasks of decoding the received database tables, the elimination of errors residing in the database tables by removing e, g, redundant data sets from the database tables or data sets with missing entries and the establishment of a common format remain at server 4. In addition, server 4 still also creates the subsets out of the queried database tables which in the present example are "viewA" and "viewB". After this further processing occurs at the client 1A, which has requested the data. The created views ("viewA", "viewB") are sent to the client 1A which has requested the data. At the client 1A which has requested the data, the created views ("viewA", "viewB") are stored in the cache or another storage system and processing in order to get the result data continues. This means for the present example the creation of view "tableAB" and the final sorting of the result data.

In some embodiments, the server 4 may even refrain from extracting the requested data from the database(s) 5, but e.g. sends complete or parts of database tables (e.g. unprocessed lines or columns of one or more database tables) to the requesting client 1A, and the client 1A employs the database operations (e.g. SQL statements) on the database tables in order to extract and process the requested data. Hence, in these embodiments, the raw data is given by complete or partial database tables. This further relieves the server 4 from data processing tasks to respond to data requests and instead makes use of the distributed computation resources of client devices.

Referring again to the present example of FIG. 3, in this variant, the queried database tables "tableA" and "tableB" are sent directly to the client 1A by the server 4. At the client 1A, the processing consequently also includes the exemplary tasks of decoding the received database tables, removing redundant data sets from the database tables or data sets, and the establishing a common format as well the extraction of the subsets out of the queried database tables, which in the present example are "viewA" and "viewB".

As a further example, partial data processing at the server side may include formatting e.g. according to Industry Foundation Classes standards (IFC standards) to make the data suitable for sending to a client 1 and for further processing by the client 1. Another example of partial processing is an update of data sets in the event that the requested database 5 is a cache and the data stored in the cache is not necessarily up to date. In this situation, the server 4 may validate the raw data retrieved from the database 5 with another database or original data source before returning the raw data to the client with message 16.

In some embodiments, returning 16 the raw data from the server 4 to the client 1 employs data compression techniques using, as an example, reusable code books to generate compressed data in a zip-format. As a consequence, web traffic load is reduced compared to returning the raw data, which is possibly more voluminous than the result data (e.g. due to filtering and data extraction only occurring at the client side), in an uncompressed manner. Since the code books only change when they get updated, it is not necessary to send the code books with every data batch. The code books can be sent separately from the data batches and only once, at the beginning of the sending of the data and when the code books have been updated.

In addition or in the alternative, in some embodiments, the raw data to be transmitted to the requesting client 1A is encrypted by the server 4. For example, encryption techniques such as secure multiparty computation (MPC) or point-to-point encryption can be applied.

At the first client 1A, the received raw data is processed 18 using a computing engine 100 shown in FIG. 7 by a data processing functionality 109 comprising of a computer program code residing in the memory 106 of the computing machine 100 of the first client 1A to get result data. The data processing at first client 1A may be done by using any suitable native software applications which can operate on the client. Also, the data processing may be done with any suitable browser application of first client or with the combination of a native application and a browser application. The data processing at first client 1A to generate the result data may be integrated into a user interface of the client device. The user interface may display the result data to a user. The result data may be presented to the user as data batches or as streaming data, whereby the streaming can be controlled by the data updates sent by server 4.

After the client 1A has concluded the client-side processing of the received raw data and, thus, has generated the result data, the client—in addition to the usual further handling (such as displaying the result data via the graphical user interface of the client device as mentioned before), different from US 2007/0005679 A1, the first client 1A also stores 19 the result data, in order to make the result data generated by the first client 1A available to other clients 1 possibly seeking to obtain the same result data in the future. In particular, in response to another request (herein referred to as third request) to obtain the result data from another client (herein referred to as the second client 1B), the first client 1A sends the result data to the second client 1B.

Making available the result data generated by the first client 1A directly to other clients 1B, 1C without relying on processing and storage capabilities of the server 4 constitutes a peer-to-peer aspect of the present embodiments. According to the present embodiments, a peer-to-peer connection is a connection between equally privileged, equipotent participants in the distributed computing environment. Peers are both suppliers and consumers of resources, in contrast to the traditional client-server model in which the consumption and supply of resources is divided between a number of servers and a number of clients. Within the present embodiments, the clients (client 1A, 1B or 1C) can thus exchange data directly between themselves without using the server 4 as a mediatory node. Server 4 may still contribute to the peer-to-peer communication by providing a back-end-architecture, i.e. procedures which facilitate client interaction. According to the present embodiments and explained in further detail below, the back-end-architecture of server 4 receives request for data from a client 1 and sends back an indication to that client 1 that the requested data is available at another client. In addition, the back-end-architecture of server 4 may also comprise of the cache of server 4, whereby the cache may store data such as tables "tableA" and "tableB", views "viewA" and "viewB" or the indications that result data is available at a certain client.

Figure 4:
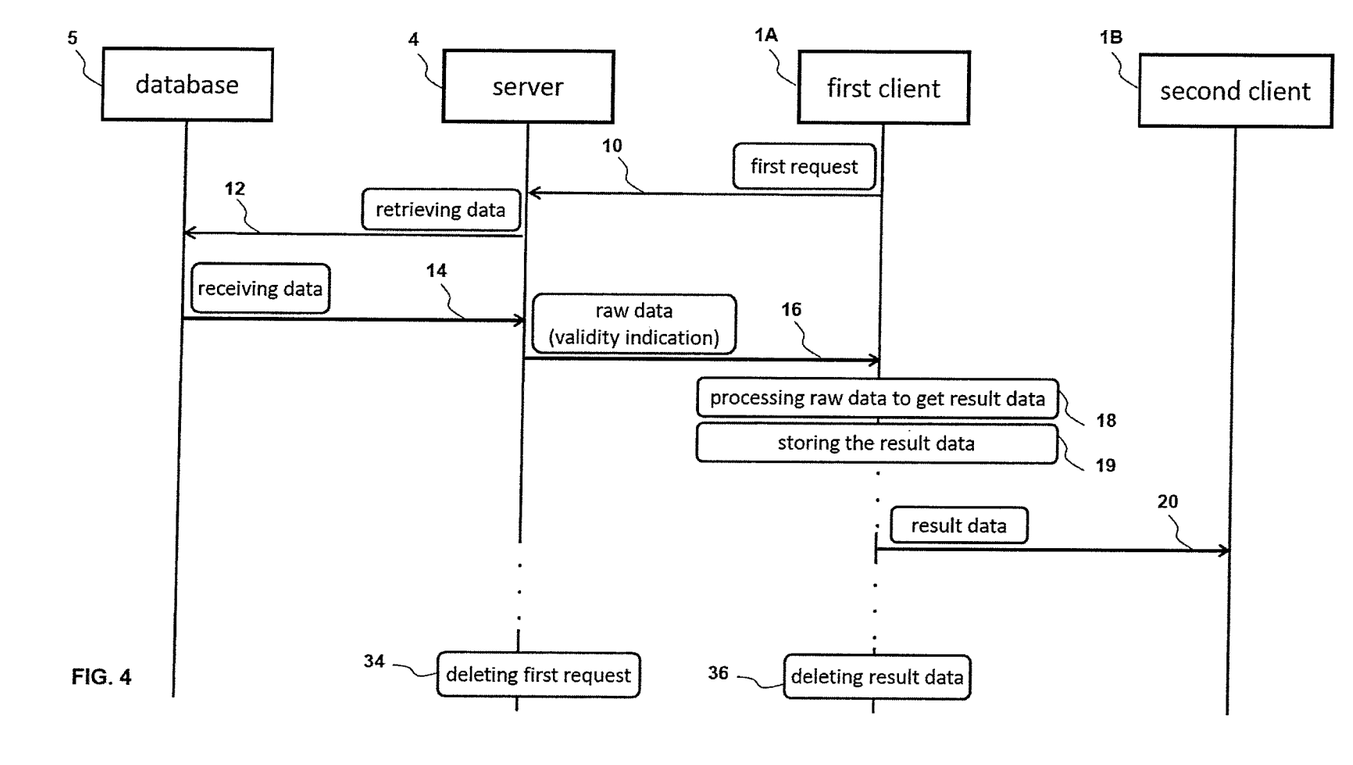
FIG. 4 is a sequence diagram according to some embodiments.
Figure 5:
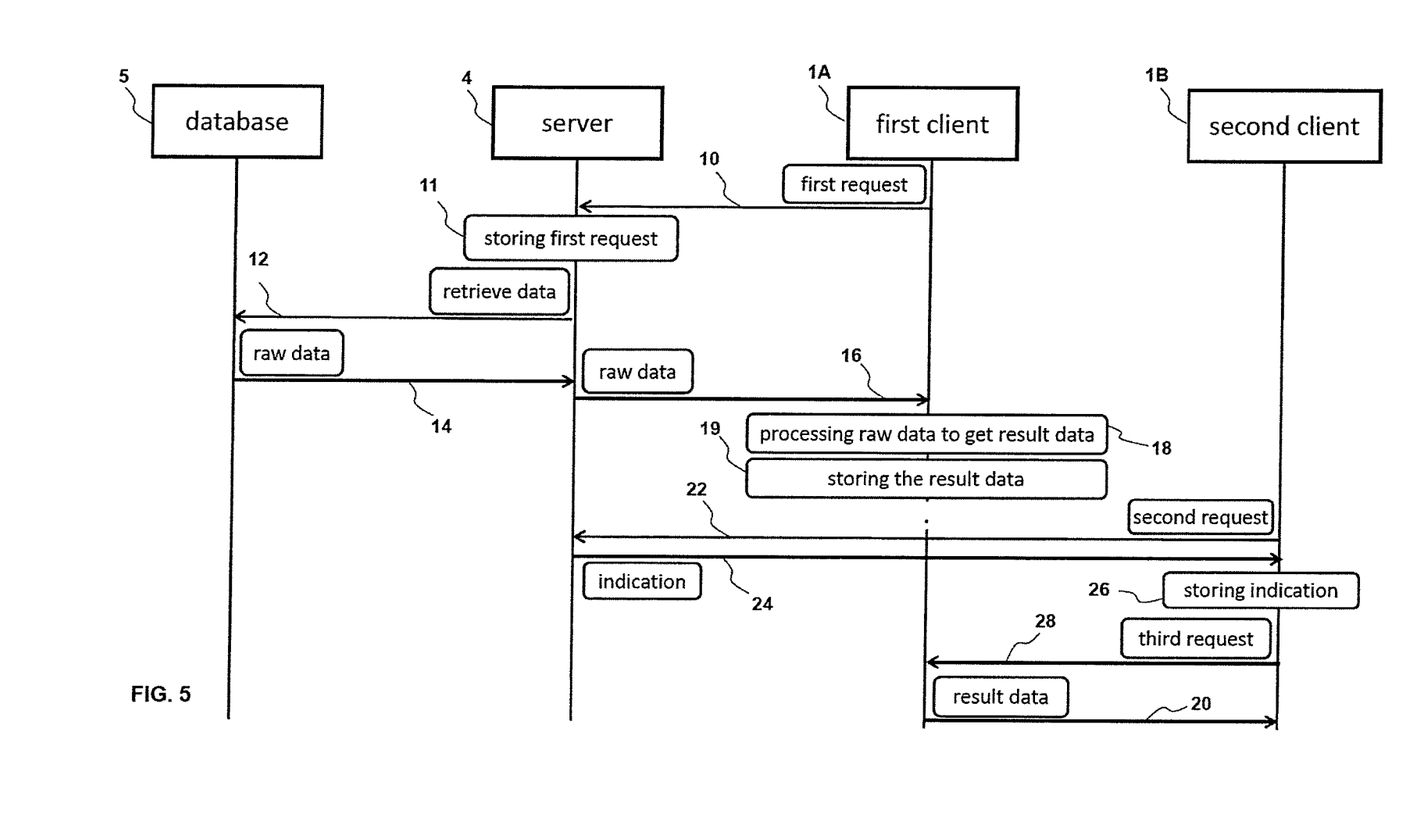
FIG. 5 is a sequence diagram according to some embodiments.

Message sequence charts of this overall processing mechanism (client-side processing, and peer-to-peer availability of the result data generated by the clients 1) are given by FIGS. 4 and 5. First client 1A sends a first request 10 for searching data to server 4. The server stores 11the first request 10 in order to facilitate making available the result data from the requesting first client 1A by means of peer-to-peer connections, as will be explained in detail below. A search 16 for the requested data is performed by server 4 in e. g. database 5A for the requested data. In some embodiments, more than one database 5 is queried by the server 4. The raw data obtained by the search 12 is received 14 and partially processed by the server 4, and then sent 16 to the first client 1A in response to the first request 10 to obtain the result data.

Furthermore, and again with reference to FIG. 4, the shifting of the processing of requested data towards the client 1A includes the sending of the result data by the first client 1A to a second client 1B (message 20 in FIG. 4). To this end, the result data obtained by the first client 1A through processing 18 is stored 19. In some embodiments, the first client 1A stores 19 the result data locally and is, thus, able to return with the result data in response to any request from another client 1. In other embodiments, the first client 1A is a member of a DHT network (distributed hash tables, as explained in further detail below) and stores 19 the result data in the DHT network, typically at another client of the DHT network.

As shown by FIG. 5, sending the result data from the first client 1A to the second client 1B may occur in response to a request (the third request 28) from the second client 1B to the first client 1A requesting the result data from the first client 1A instead requesting the result data from the server 4 by means of a first request 10. This goes beyond usual peer-to-peer networks as e.g. described by U.S. Pat. Nos. 8,276,084 B2 and 8,616,976 B2 where data originally received from the server is further propagated among peers. These usual peer-to-peer networks are thus not arranged to make available the results of the client-side processing of the first client (and thus effectively the computation resources employed to obtain the result data) to other clients, thereby—compared to the usual peer-to-peer networks as e.g. described by U.S. Pat. Nos. 8,276,084 B2 and 8,616,976 B2—relieving the other clients from processing the raw-data again.

With further reference to FIG. 5, the second client 1B may have become aware of the fact that the requested result data are available at the first client 1A by way of a second request 22 for obtaining the result data from the server 4. In response to receiving the second request 22, the server looks up the stored first request (activity 11 in FIGS. 4 and 5) and determines therefrom that the result data is already available at the first client 1A (as the server 4 previously returned the corresponding raw data to the first client 1A and is aware that the first client 1A has generated and then stored the result data based on the returned raw data). Hence, instead of again retrieving raw data from the one or more databases 5, perform the partial processing and returning the raw data to the second client 1B, the server 4 returns an indication 24 that the result data is available at the first client 1A. In response to receiving this indication, the second client 1B stores 26 the indication (in order to be able to inform still other clients 1 of the fact that the result data is available at the first client 1B) and retrieves the result data from the first client 1A by way of the third request 28 and the result data response 20.

According to some embodiments, the clients 1 and the server 4 form nodes of a distributed computing system using distributed hash tables (DHT). To use again the aforementioned example of querying relational databases using SQL statements, unique identifiers, which comprises of alphanumeric strings and which are commonly known as keys, can be calculated based on search parameters identifying the result data, e.g. the SQL parameters to be used to retrieve the view "tableAB" as introduced above. The calculation of unique identifiers or keys can be performed by any client, e.g. by means of a hash function over the request parameters. These keys indicate to the clients at which other clients 1 the corresponding result data (e.g. the view "tableAB") are stored (e.g. by employing a DHT key-space partitioning algorithm), so that any other participating client 1 can efficiently retrieve the view associated with a given unique identifier from another client 1 at which the corresponding result data are stored. The client 1, at which the corresponding result data are stored does not necessarily has to be the same client at which the corresponding result data has been previously calculated. The result data may has been calculated e.g. at the first client 1A and then sent to another client 1 (e.g. the third client 1C) where the result data has been finally stored at.

In some embodiments, the indications sent 24 by the server 4 to the second client 1B and/or the indications 32 sent by the second client 1B to the third client 1C, as discussed further below with reference to in FIG. 6, may comprise one or more unique DHT identifiers.

In some embodiments, the clients 1 can also form the aforementioned distributed computing system using distributed hash tables (DHT) without inclusion of the server. This optional configuration removes further workload from the server.

Referring back to the peer-to-peer-based transmission of the result data from the first client 1A to the second client 1B as discussed above with reference to FIGS. 4 and 5, and with continuing reference to the implementation example of FIG. 3 above, the second client 1B sends the second request 22 to the server 4 to retrieve the same result data as the first client 1A, which in the case of the present example are the data contained in the view "tableAB". The server 4 informs 24 the second client 1B that the result data ("tableAB") is available at the first client 1A. The indication 24 may comprise a key of a DHT system, whereas the key has been calculated from view "tableAB". The view "tableAB" may be stored in the cache of the first client 1A in order to e. g. ease the distribution of view "tableAB" among the clients.

The second client 1B then retrieves the result data ("tableAB") from the first client 1A by way of the third request 28 to obtain the result data. Thus, processing and storage resources of the server 4 are relieved, beyond e.g. US 2007/0005679 A1. The third request 28 is similar to the first request 10 and the second request 22 with the exception that it is directed to the first client 1A as opposed to the server 4. In other words, from the perspective of the second client 1B, the first client 1A acts as a server responding with the result data. Compared with the prior art result data response shown by FIG. 2 as discussed above, however, the first client 1A is able to return the requested result data significantly faster and with less computation resources because the result data ("tableAB") is available and stored at the first client 1A in an already completely processed state and no further database retrieval or processing is required.

As an additional option, in some embodiments, the clients 1, particularly the first client 1A, are not only arranged to store and make available the result data processed using the raw data received from the server 4, but also at least a part or the complete raw data itself. Referring again to the example above, the first client 1A stores the two tables "tableA" and "tableB" in addition to the view "tableAB". As mentioned above, the raw data is either stored locally or in a DHT network (i.e. typically at another client being a member of the DHT network). In response to a request for the raw data from another client (e.g. the second client 1B), the first client 1A returns the requested raw data. The fact that the raw data is stored at the first client 1A may be discovered by the second client 1B in the same manner as already explained in detail above for the result data. By this, the server 4 is additionally relieved from providing the raw data in use cases where clients do not request the exact result data stored at another client (e.g. a view "tableAB-2" being different from the view "tableAB", but producible from the two tables "tableA" and "tableB"), but different result data which can be obtained from the same raw data by client-side processing.

Optionally, in some embodiments, the first client 1A also receives an indication from server 4 about a validity duration of the raw data returned with the response 16. The raw data returned by the server 4 to the first client by way of message 20 (FIGS. 4 and 5) may change after a certain amount of time, thereby invalidating the result data generated 18 by the first client 1A based on the raw data. In order to avoid distributing outdated result data to other clients 1 by the first client 1A, the server 4 may provide a validity indication for the raw data. As exemplarily shown in FIG. 4, this validity indication may be included in the response message 16 carrying the raw data in response to the first request 10. In addition or alternatively, the indication is transmitted by the server 4 in a separate message to the first client 1A after returning 16 the raw data. In some embodiments, the validity indication may also be updated (e.g. if the validity of the raw data has turned out to be longer than indicated by a first validity indication at the time of the return 16 of the raw data).

The validity indication indicates a certain point of time when the raw data is likely going to change and therefore also the result data generated by the first client 1A on the basis of the raw data is not valid anymore. The indication may indicate an absolute point of time (e.g. 22 Oct. 2018, 3 pm) or a relative time referring to the point of time of the response message 16.

The validity indication is also stored at the server 4 and is facilitated by both, the first client 1A and the server 4 in order to avoid distribution of potentially outdated result data. More specifically, as shown by FIG. 4, the first client 1A deletes 36 the result data at a given time (e.g. after reception of the response message 16 and the storage of the result data) corresponding to the validity duration indicated by the server. Correspondingly, the server 4 deletes 34 the stored first request at a given time e.g. after the return of the raw data corresponding to the validity duration. In this way, the first client 1A is hindered to return the result data to other clients 1 and the server 4 is hindered to direct other clients 1 requesting the result data to the first client 1A (but will return the potentially updated raw data to the next requesting client 1).

In some embodiments, data requests 10 by the first client 1A are sent to several servers 4 by using metasearch engines. Metasearch engines are search tools that use data retrieved by other search engines to produce their own results. According to some embodiments, metasearch engines take input from a client and simultaneously send out queries to third party search engines for raw data. Relevant raw data is gathered, formatted by their ranks and presented to the client.

In some embodiments, the first client 1A employs a listening mode and waits for updates of raw data sent by server 4. The updates may be triggered either by a certain event such as the change of a defined amount of raw data on the server 4 or by a timer. Citing again the example of relational databases and SQL-statements, first client 1A may be subscribed to regular updates of result data as stored in view "tableAB", and will therefore receive from server 4 updates of the views "tableA" and "tableB". First client 1A then processes the updated views "tableA" and "tableB" to get an updated version of view "tableAB".

Figure 6:
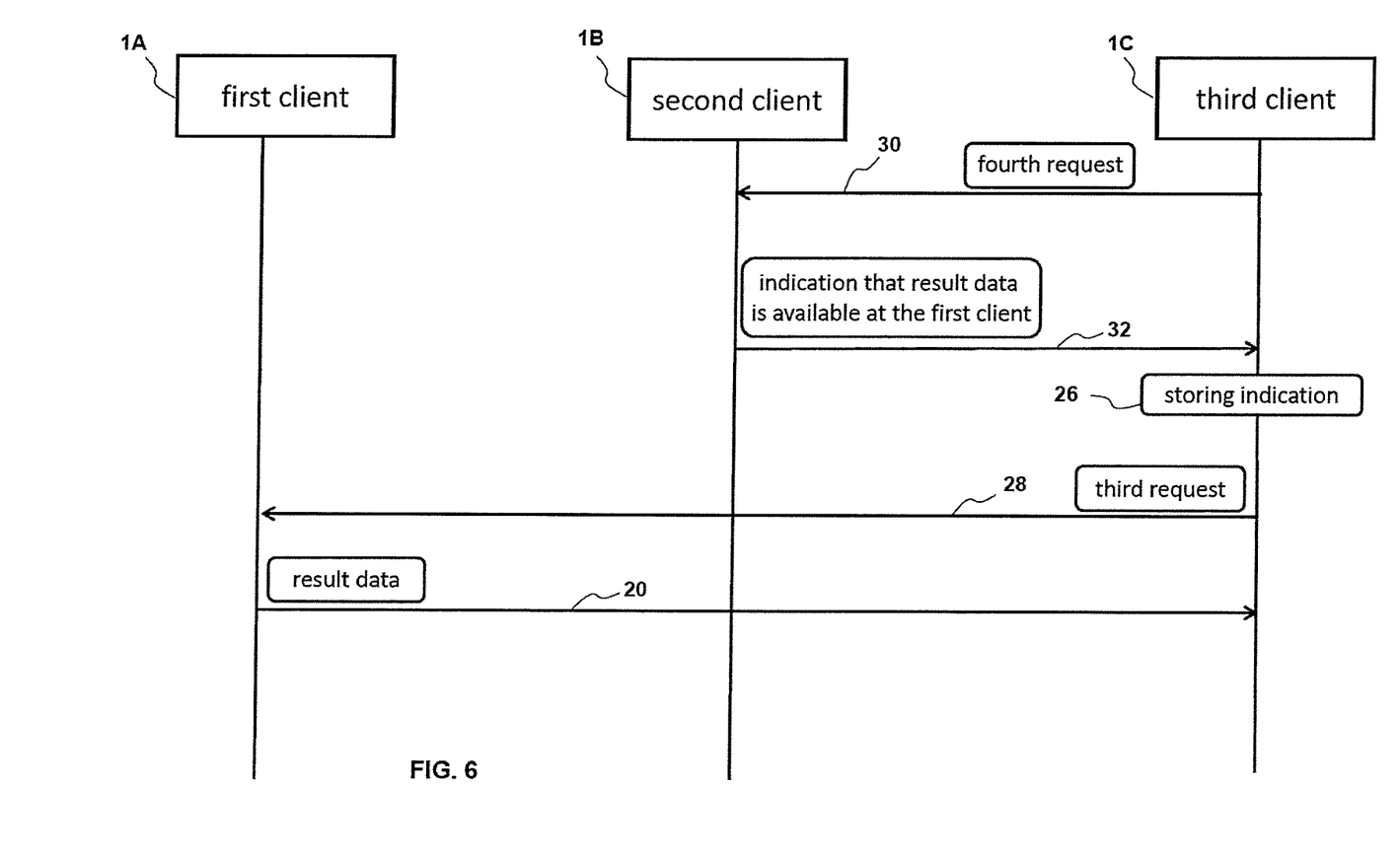
FIG. 6 is a sequence diagram according to some embodiments.

Referring now to FIG. 6, in some embodiments, the mechanism as discussed above with reference to FIGS. 4 and 5 additionally includes, at the second client 1B, receiving 24 a fourth request 30 to obtain the result data from a third client 1C and, in response, sending 32 the indication previously received by the server 4 (message 24 in FIG. 5) that the result data is available at the first client 1A to the third client 1C. To this end, the second client 1B has stored 26 the indication previously after reception from the server 4. Again, the sending of the indication 25 may comprise a key of a DHT system, whereas the key has been calculated from view "tableAB".

Similar to the second client 1B in FIG. 5, the third client 1C is then able to retrieve the result data from the first client 1A by e.g. the aforementioned peer-to-peer connection, by way of a third request 28 and the result data response 20 (FIG. 6).

In some embodiments, the result data is stored in the cache 107 of the computing machine 100 of the first client 1A or another storage system of first client 1A (not shown in FIG. 7), before sending 20 the result data by the first client 1A to the second client 1B or to the third client 1C.

In some embodiments, similar as already set out above for the server 4, sending 20 the raw data to the first client 1A in response to the first request 10, the result data is encrypted prior to sending 20 the result data to second client 1B or to the third client 1C. For the encryption process, techniques such as secure multiparty computation (MPC) or point-to-point encryption can be applied.

In some embodiments, the sending 20 of the result data from the first client 1A to second client 1B and/or to the third client 1C utilizes data compression techniques using, as an example, reusable code books to generate compressed data in a zip-format, in a similar manner as explained above.

Note that, generally, any client 1 participating in a system shown by FIG. 1 may be equipped with the functions described above for the first client 1A (client-side processing 18 of raw data to generate result data, storing 19 the generated result data, returning 20 the stored result data to other clients in response to requests 28 to obtain the result data, deleting 36 the result data after a given validity time has passed), the second client 1B (receiving 24 an indication from the server 4 that requested result data is available at another client 1, storing 26 the indication 24, requesting 28 the result data from the other client, and responding 32 with the indication that the result data is available at another client in response to receiving a request 30 for obtaining the result data from still another client) and for the third client (requesting 30 result data from another client, receiving 32 the indication that the result data is available at still another client and requesting 28 the result data from this still other client), depending on which result data is available at which client at a given point of time. In order to relieve the server 4, the clients 1 may e.g. be arranged to first request result data from other clients 1 and the server 4 is requested only in the event that no other known client has the result data available or after a given number of unsuccessful requests to other clients 1.

Furthermore, functions of the various client roles are combined in certain embodiments. For example, a client 1 acting as a second client 1B may also store 19 the result data retrieved from the first client 1A, in order to make the result data available via the peer-to-peer network to still other clients, in addition to the storage of the result data at the first client 1A. In this way, the second client 1B also acts as a first client 1A for this result data, and the same result data becomes available at a number of clients 1, thereby further contributing to relieving the server 4.

FIG. 7 is a diagrammatic representation of the internal component of a computing machine of the server 4 or the clients 1A, 1B, 1C. The computing machine 100 includes a set of instructions to cause the computing machine 100 to perform any of the methodologies discussed herein when executed by the computing machine 100. The computing machine 100 includes at least one processor 101, a main memory 106 and a network interface device 103 which communicate with each other via a bus 104. Optionally, the computing machine 100 may further include a static memory 105 and a disk-drive unit. A video display, an alpha-numeric input device and a cursor control device may be provided as examples of user interface 102. The network interface device 103 connects the computing machine 100 to the other components of the distributed computing system such as the clients 1A, 1B, 1C, the server 4 or the databases 5.

Computing machine 100 also hosts the cache 107. The cache 107 may store the received database tables also in a cache. The cache 107 within the present embodiments may be composed of hardware and software components that store the database tables so that future requests for the database tables can be served faster than without caching. There can be hardware-based caches such as CPU caches, GPU caches, digital signal processors and translation lookaside buffers, as well as software-based caches such as page caches, web caches (HTTP caches) etc. Both, the server 4 and the clients 1 may comprise of a cache 107. Server 4 then starts data processing such as decoding the received database tables, elimination of errors residing in the database tables by removing e, g, redundant data sets from the database tables or data sets with missing entries. Furthermore, the database tables are brought into a common data format to ease further processing.

Overall, the present embodiments allow efficient data handling in distributed networks with servers and clients. Servers are relieved from computing-power-intensive processing in order to respond to data requests from clients by utilizing the computation power of the clients. Servers are also relieved from caching result data as result data generated by the clients is made available through a peer-to-peer network via the clients. The servers keep a logbook about which result data has been requested by which client and, thus, which result data is available at which client, and direct clients requesting a particular result data to the corresponding client which has the result data available. The present embodiments also facilitate an invalidity mechanism to avoid propagation of potentially outdated result data via the clients. Further enhancements are provided by employing compression and encryption mechanisms.

A set of computer-executable instructions (i.e., computer program code) embodying any one, or all, of the methodologies described herein, resides completely, or at least partially, in or on a machine-readable medium, e.g., the main memory 106. Main memory 106 hosts computer program code for functional entities such as database request processing 108 which includes the functionality to receive and process database requests and data processing functionality 109. The instructions may further be transmitted or received as a propagated signal via the Internet through the network interface device 103 or via the user interface 103. Communication within computing machine is performed via bus 104. Basic operation of the computing machine 100 is controlled by an operating system which is also located in the main memory 106, the at least one processor 101 and/or the static memory 105.

In general, the routines executed to implement the embodiments, whether implemented as part of an operating system or a specific application, component, program, object, module or sequence of instructions, or even a subset thereof, may be referred to herein as "computer program code" or simply "program code". Program code typically comprises computer-readable instructions that are resident at various times in various memory and storage devices in a computer and that, when read and executed by one or more processors in a computer, cause that computer to perform the operations necessary to execute operations and/or elements embodying the various aspects of the embodiments of the invention. Computer-readable program instructions for carrying out operations of the embodiments of the invention may be, for example, assembly language or either source code or object code written in any combination of one or more programming languages.

The invention claimed is:

1. A method for handling data in a distributed computing environment comprising a server and a plurality of clients, the plurality of clients comprising a first client and a second client, and the method comprising, at the first client:
   sending a first request to the server to obtain result data, wherein the first request comprises client request requirements;
   receiving raw data from the server as a response to the first request, the raw data being in a state that is not yet completely processed by the server in order to meet client request requirements and enabling the first client to transform the raw data into the result data;
   in response to determining that the raw data from the server is not in accordance with the client request requirements, processing the raw data to obtain the result data based on the client request requirements;
   storing the result data;
   receiving a second request from the second client to obtain the result data; and
   sending the result data to the second client in response to receiving the second request.

2. The method of claim 1, further comprising, at the server:
   storing the first request received from the first client as a first indication that the result data is available at the first client.

3. The method of claim 2, further comprising, at the second client:
   sending a third request to the server for obtaining the result data; and
   receiving the first indication from the server.

4. The method of claim 3, further comprising, at the second client:
   storing the first indication; and
   sending the second request to the first client to obtain the result data.

5. The method of claim 4, further comprising, at the second client:
   receiving a fourth request from a third client to obtain the result data; and
   sending the first indication to the third client.

6. The method of claim 5, further comprising, at the first client:
   receiving a second indication from the server indicating a validity duration of the raw data; and
   deleting the result data at a given time corresponding to the validity duration.

7. The method of claim 6, wherein the first request stored at the server includes the second indication, and further comprising, at the server:
   deleting the first request stored at the server at the given time corresponding to the validity duration indicated by the server.

8. The method of claim 1, wherein the result data is directly sent from the first client to the second client without being processed by the server.

9. The method of claim 1, wherein sending the first request to the server to obtain the result data is in response to a trigger event.

10. The method of claim 9, wherein the trigger event comprises a change of a defined amount of raw data on the server.

11. The method of claim 9, wherein the trigger event is based on a validity indication duration.

12. A computing machine acting as a first client for handling data in a distributed computing environment comprising a server and a plurality of clients, the plurality of clients comprising the first client and a second client, and the computing machine including at least one processor and a memory containing instructions that, when executed by the at least one processor, cause the computing machine to perform operations comprising:
   send a first request to the server to obtain result data, wherein the first request comprises client request requirements;
   receive raw data from the server as a response to the first request, the raw data being in a state that is not yet completely processed by the server in order to meet client request requirements and enabling the first client to transform the raw data into the result data;
   in response to determining that the raw data from the server is not in accordance with client request requirements, process the raw data to obtain result data based on the client request requirements;
   store the result data;
   receive a second request from the second client to obtain the result data; and
   send the result data to the second client in response to receiving the second request.

13. The computing machine of claim 12, wherein the result data is directly sent from the first client to the second client without being processed by the server.

14. The computing machine of claim 12, wherein send the first request to the server to obtain the result data is in response to a trigger event.

15. The computing machine of claim 14, wherein the trigger event comprises a change of a defined amount of raw data on the server.

16. The computing machine of claim 14, wherein the trigger event is based on a validity indication duration.

17. A computer program product comprising:
   a non-transitory computer-readable storage medium comprising program code instructions that upon execution by at least one processor of a computing machine cause the computing machine to act as a first client for handling data in a distributed computing environment, the distributed computing environment comprising a server and a plurality of clients, the plurality of clients comprising the first client and a second client, and wherein the instructions comprise:
   send a first request to the server to obtain result data, wherein the first request comprises client request requirements;
   receive raw data from the server as a response to the first request, the raw data being in a state that is not yet completely processed by the server in order to meet client request requirements and enabling the first client to transform the raw data into the result data;
   in response to determining that the raw data from the server is not in accordance with client request requirements, process the raw data to obtain result data based on the client request requirements;

store the result data;
receive a second request from the second client to obtain the result data; and
send the result data to the second client in response to receiving the second request.

18. The computer program product of claim 17, wherein the result data is directly sent from the first client to the second client without being processed by the server.

19. The computer program product of claim 17, wherein send the first request to the server to obtain the result data is in response to a trigger event, wherein the trigger event comprises a change of a defined amount of raw data on the server.

20. The computer program product of claim 17, wherein send the first request to the server to obtain the result data is in response to a trigger event, wherein the trigger event is based on a validity indication duration.

* * * * *